J. B. REAGAN.
POULTRY ROOST.
APPLICATION FILED SEPT. 17, 1917.

1,301,321.

Patented Apr. 22, 1919.

INVENTOR:
J. B. REAGAN
By P. A. Bronson
Atty.

UNITED STATES PATENT OFFICE.

JOHN BARTHOLOMEW REAGAN, OF BANCROFT, IOWA.

POULTRY-ROOST.

1,301,321.  Specification of Letters Patent.  Patented Apr. 22, 1919.

Application filed September 17, 1917. Serial No. 191,908.

*To all whom it may concern:*

Be it known that I, JOHN BARTHOLOMEW REAGAN, a citizen of the United States, and resident of Bancroft, Kossuth county, Iowa, have invented a new and useful Poultry-Roost, of which the following is a specification.

The object of this invention is to provide an improved construction for a sanitary poultry roost.

A further object of this invention is to provide improved means for carrying a disinfecting liquid in suitable relation to a poultry perch so as to permit the fumes of such liquid to contact with fowls occupying the perch.

A further object of this invention is to provide improved means for mounting a trough for a disinfectant in suitable relation to a poultry perch in such manner as to shield the trough from becoming filled with dirt and other refuse.

A further object of this invention is to provide a cheap, simple and durable construction for a sanitary poultry roost capable of supplying the fumes of a disinfectant to the fowls on the perches, without the use of wicks or similar devices, and in such relation that the fowls cannot come into actual contact with the disinfecting liquid.

My invention consists in the construction, arrangement and combination of elements hereinafter set forth, pointed out in my claims and illustrated by the accompanying drawing, in which—

Figure 1:
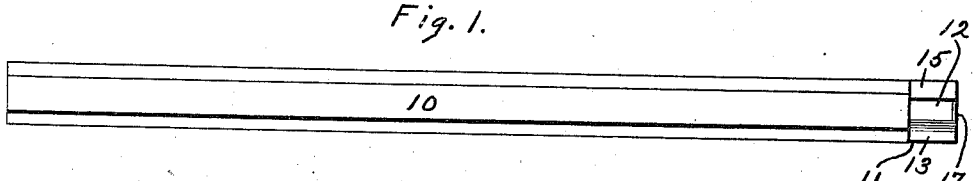
Figure 2:
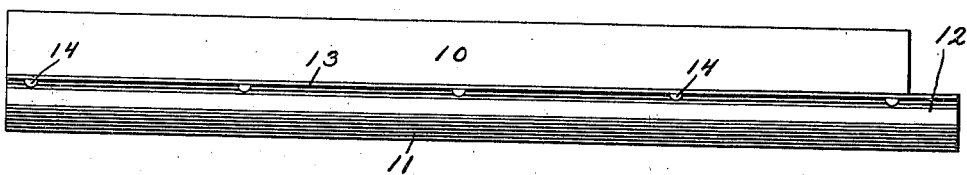
Figure 3:
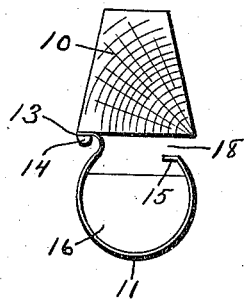
Figure 4:
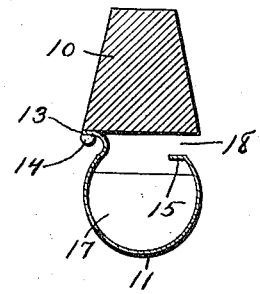
Figure 5:
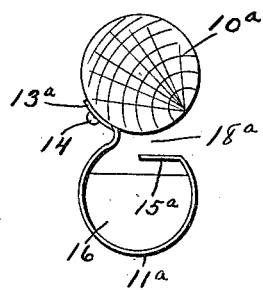

Figure 1 is a plan of a poultry perch bar constructed in accordance with my invention. Fig. 2 is a side elevation of the same. Fig. 3 is an end elevation and Fig. 4 a cross-section of the device, on an enlarged scale. Fig. 5 is an end elevation of a modified form of the device.

In the construction of the device as shown in Figs. 1 to 4 inclusive the numeral 10 designates a perch bar preferably formed of wood, of any desired length and in this instance trapezoidal in cross-section, with its narrower transverse dimension arranged uppermost. A metal trough, designated generally by the numeral 11, is mounted beneath, extends longitudinally of and is secured to the perch bar 10. The trough 11 has one end projecting beyond the adjacent end of the perch bar 10, as shown in Figs. 1 and 2 and indicated by the numeral 12, for convenience in introducing disinfecting or fumigating fluid to said trough. The trough 11 preferably is generally circular in cross-section but is open at its top beneath and slightly spaced from the lower surface of the perch bar 10. One margin of the metal of which the trough is formed is turned outwardly throughout the length of the trough to form a flange 13 adapted to contact with the lower surface of the perch bar 10, along one margin of such surface, and be secured thereto by nails or screws 14. The opposite margin of the metal of which the trough is formed is turned inwardly in a horizontal plane lower than the plane of the flange 14, forming a flange 15 substantially parallel with and spaced beneath the lower surface of the perch bar 10. The ends of the trough are closed by segmental end walls 16, 17. The diameter of the trough 11 preferably corresponds substantially with the greatest transverse dimension of the perch bar 10.

In use the perch bars are supported in any desired number and in any desired manner to provide the necessary roost assembly for the flock. The troughs 11 are supplied with suitable disinfecting or fumigating fluid by pouring it into the projecting end portions 12. Fumes from the liquid in the trough pass through the space between the flange 15 and the bottom of the perch bar, such space being indicated by the numeral 18 and pass upwardly and around said perch bar and into contact with and dissemination among the feathers of any fowls which may be occupying the perch, to the end of destroying vermin on said fowls. The narrowness of the space 18, together with the inturning of the flange 15, prevents insertion of the toes of the fowls within the trough 11 or into actual contact with the fluid therein.

In Fig. 5 I have shown the perch bar $10^a$ circular in cross-section, and the trough $11^a$ of approximately the same diameter. The flange $13^a$ of the trough is curved to fit the bar $10^a$. The protecting flange $15^a$ of the trough preferably is extended inwardly far enough to come to approximately the median line of the circular bar $10^a$, because of the necessarily greater width of the space $18^a$ caused by the opposite curving of the members $10^a$ and $11^a$ adjacent said space.

It is to be understood that the perch bars may be made in any desired cross-sectional shape, and I do not desire to be understood as limiting myself to the precise shape shown and described, nor to the precise shape and arrangement of the flanges of the trough, which may be modified to conform to the requirements made necessary by the shape of the perch bar.

I claim as my invention—

1. A device of the class described, comprising a perch bar and a trough arranged longitudinally beneath said bar, said trough being formed at one side with an outturned flange secured to said bar, and on the opposite side being spaced from said bar, the free margin of said trough being formed with an inturned flange.

2. A device of the class described, comprising a perch bar and a metal trough arranged longitudinally beneath said bar, said trough being generally circular in cross-section and of approximately the same diameter as the greatest transverse dimension of said bar, the metal at one margin of said trough being bent laterally to form a flange adapted to be secured to said bar, the metal at the other margin of said trough being bent inwardly to form a flange spaced beneath said bar.

JOHN BARTHOLOMEW REAGAN.